United States Patent
Padoy

(10) Patent No.: US 6,817,755 B2
(45) Date of Patent: Nov. 16, 2004

(54) DEVICE FOR MEASURING EXCHANGES OF AMOUNTS OF HEAT IN NON-STATIONARY OPERATING CONDITIONS

(75) Inventor: Jean-Claude Padoy, Valeyres-sous-Montagny (CH)

(73) Assignee: Thermoflux S.A. (CH)

( * ) Notice: Subject to any disclaimer, the term of this patent is extended or adjusted under 35 U.S.C. 154(b) by 0 days.

(21) Appl. No.: 10/363,843

(22) PCT Filed: Sep. 5, 2001

(86) PCT No.: PCT/CH01/00537

§ 371 (c)(1),
(2), (4) Date: Aug. 22, 2003

(87) PCT Pub. No.: WO02/23144

PCT Pub. Date: Mar. 21, 2002

(65) Prior Publication Data

US 2004/0042932 A1 Mar. 4, 2004

(30) Foreign Application Priority Data

Sep. 11, 2000 (FR) .............................. 00 11527

(51) Int. Cl.⁷ .............................................. G01K 17/20
(52) U.S. Cl. ............................................ 374/29; 374/35
(58) Field of Search ............................. 374/30, 29, 35; G01K 17/20

(56) References Cited

U.S. PATENT DOCUMENTS

| | | | | |
|---|---|---|---|---|
| 3,199,352 A | * | 8/1965 | Macatician | 374/30 |
| 3,217,543 A | * | 11/1965 | Van Haagen | 374/29 |
| 5,048,973 A | * | 9/1991 | Liebert et al. | 374/29 |
| 5,697,706 A | * | 12/1997 | Ciaravino et al. | 374/166 |
| 5,772,329 A | * | 6/1998 | Bardon et al. | 374/30 |
| 6,186,661 B1 | * | 2/2001 | Hevey et al. | 374/29 |

FOREIGN PATENT DOCUMENTS

| | | | | |
|---|---|---|---|---|
| JP | 59015829 A | * | 1/1984 | G01K/17/20 |
| JP | 59057127 A | * | 4/1984 | G01K/17/20 |
| JP | 2000019030 A | * | 1/2000 | G01K/17/20 |
| WO | WO 200008431 A1 | * | 2/2000 | G01K/17/20 |

OTHER PUBLICATIONS

Kaiser E., "Dynamic measuring error correction of encapsulated auxiliary wall heat flux sensors made of film resistance thermometers", Measurement, GB, Institute of Measurement and Control (London) vol. 8, No. 1, (1990) p. 12–16 XP000136374, ISSN: 0263.*

Derwent Abstract (English) of WO 200008431A (published in French Feb. 17, 2000), DERWENT–ACC–No.:2000–195651, DERWENT–Week: 200382 (2003).*

* cited by examiner

Primary Examiner—Edward Lefkowitz
Assistant Examiner—Stanley J. Pruchnic, Jr.
(74) Attorney, Agent, or Firm—Gibbons, Del Deo, Dolan, Griffinger and Vecchione

(57) ABSTRACT

The invention concerns a device (10) for measuring exchanges of amounts of heat in non-stationary operational conditions, including an elongated housing (11) having one measuring end (12) closed and one connecting end (13) and a central cavity (14). The central cavity (14) contains a measuring cell (15) and electrical connection members (13). The housing (11) is extended by a hollow finger (17) which contains partly at least the measuring cell (15) which consists of a sensitive heat flux measuring element (18) sandwiched between a first heat conducting component (19) and a second heat conducting component (20). The first heat conducting component (19) is in contact with at the least one surface of the said housing (11), and in the second heat conducting component (20) is insulated from the housing and constitutes a constant heat capacity.

11 Claims, 7 Drawing Sheets

DEVICE FOR MEASURING EXCHANGES OF AMOUNTS OF HEAT IN NON-STATIONARY OPERATING CONDITIONS

This application is a National Stage Application of PCT/CH01/00537 which claims priority from FR 0011527 filed Sep. 11, 2000.

TECHNICAL FIELD

The present invention concerns a device for the measurement of exchanges of amounts of heat in non-stationary operational conditions, these conditions having a low level dynamic buried in an environment highly disturbed by important thermal fields, the said device comprising an elongated housing provided with a central cavity, one measuring end and one connection end, the measuring end being closed and the central cavity containing, on the one hand, a measuring cell and, on the other hand, electrical connection members, the said measuring cell comprising at the least one sensitive heat flux measuring element sandwiched between a first heat conducting component and a second heat conducting component.

BACKGROUND ART

Such a device allows measuring in real-time of the amounts of heat generated by rheological modifications of material during a transformation thereof, such as for example synthetic material during a plastification process in an extruder or injection machine. The information gathered is significant of the state of the material at a given moment, notably its pressure, its temperature, its viscous flow or, in some housings, its change of phase or its deterioration during another transformation process.

It is well known that the data of sensors, notably data regarding the temperature, the pressure and the viscosity are likely to supply information on the state of the material, but it is complex to obtain, in real-time, comprehensive local information on the Theological state of this material in the course of transformation at a given moment.

One knows from experience that all this information can be supplied by sensors referred to as thermal flux sensors using an appropriate computer processing of the signals delivered by these sensors. The physical amounts cited previously are all translated by exchanges of amounts of heat, i.e. that any rheological phenomenon where one can express the evolution as a thermal quantity is detectable.

Most of the existing heat flux sensors have been designed to measure mainly flux of the heat balance type representative of heat exchanges between material and its environment. As the heat flux generated in the heart of the material at the time of local rheological modifications are very low as compared with the flux from exchanges with the environment, they are therefore drowned in a signal of considerable level which must be processed in order to be able to extract the required information. This is a complicated and costly method and it appears complex to include at the present time such devices in an industrial process so as to operate a control on-line.

Now, for this type of application, it is the dynamic of transformations of the material, which, is essential and not the heat balance. This is why a thermal flux sensor has been developed meeting these requirements and which has been the subject of the international patent application published under the number WO 00/08431 and entitled 'Measurement device for exchanges of amounts of heat in unsteady, non-stationary or transient operational conditions'.

This device comprises a measuring cell having at least one thermal flux sensitive element sandwiched between a first heat conducting component and a second heat-conducting component. The measuring cell comprises a flat circular base which is held in contact by mechanical compression means against the inner surface of the bottom of a body in which is arranged the measuring cell.

Due to this, the two components which hold the said sensitive element sandwiched are in direct contact with the body of the device which is itself linked to the environment of the material to be controlled. The result is that this device is fitted to measure the exchanges of amounts of heat between the material to be controlled and its immediate environment. As an example, the device is capable of measuring the exchanges of amounts of heat between the outer sheath of an injection-moulding machine and the synthetic material itself in the course of transformation, which flows inside this sheath in molten state. It is obvious that heat exchanges occur continuously between the material and its immediate environment in such a way that the measurements carried out by this device do not allow control over the evolution of the material during plastification in the area where the material is in a molten state, in an efficient and reliable manner.

DISCLOSURE OF INVENTION

The present invention intends to obviate these disadvantages by facilitating making an accurate check on the evolution of the material during its transformation through a simple measurement of exchanges of amounts of heat corresponding no longer to exchanges due to flux resulting from the heat balance between the material and its environment, but exclusively to local exchanges between the material and a reference heating device.

This object is achieved by the device such as defined in the preamble and characterized in that the said first heat conducting component is in contact with at the least one surface of the said housing, and in that the said second heat conducting component is insulated from the said housing and constitutes a constant heat capacity.

Due to this fact, the thermal flux type sensitive element is arranged between the said first component, which constitutes a heat electrode in contact with the environment to be controlled, and the said second component, which constitutes a specified heat capacity.

Through these means, one measures exchanges of amounts of heat, no longer between the material to be controlled and its immediate environment, but between the material to be controlled and a reference heat capacity perfectly specified, built into the measuring cell and heat insulated from the housing of the device.

When a local rheological modification occurs within the material represented by an absorption, restoration or production of energy in heat form, amounts of heat are exchanged with the heat capacity of the measuring device by flowing through the thermal flux sensitive element. The amounts of heat are stored in the heat capacity of the device, where the temperature rises up until it is balanced with the temperature of the local material.

When the phenomenon is no longer exothermic but endothermic, the heat capacity of the device, in reverse, sheds the amounts of heat which are exchanged with the material through the thermal flux sensitive element, up until the next local thermal equilibrium.

The dynamic of these local heat exchanges is detected by the thermal flux sensitive element which generates an electric signal significant of these exchanges, in real-time.

The electric signal obtained is non-stationary. It supplies information in real-time, on the dynamic of local rheological modifications of the material, in an environment highly disturbed notably by exchanges of thermal energy at very high level between the material and its environment.

According to a preferred embodiment, the measuring end of the housing is slightly flat and one of the ends of the said first heat-conducting component is at least partially in contact with an inner surface of the said measuring end.

Conveniently, the said first heat-conducting component comprises a heel provided with a contact surface the shape and dimensions of which correspond to that of an inner surface of the said measuring end.

According to an initial embodiment, the said contact surface of the said heel of the said first heat-conducting component is circular.

According to a second embodiment, the measuring end of the housing is slightly tapered and one of the ends of the said first heat-conducting component is at least partially in contact with an inner surface of the said measuring end.

According to this second embodiment, the said first heat conducting component comprises a heel provided with a contact surface, this contact surface being up against an inner surface of same geometry as the said tapered measuring end.

Preferably, the thermal flux sensitive element as well as the said first heat conducting component and the said second heat conducting component are coated with a layer of gold, at least on their mutual surfaces, so as to ensure, through diffusion of the layer of gold, a close heat conductive contact between the components involved.

According to a particularly simple, efficient and convenient construction, the housing comprises, on the side of its measuring end, a hollow finger where the thickness is reduced as compared with the rest of the body so as to present a considerable axial thermal resistance, the measuring cell being necessarily housed in this finger.

The measuring cell is preferably maintained at the bottom of the hollow finger through means of compression fitted to ensure flattening of the said first heat conducting component against the inner surface of the measuring end.

According to a particularly interesting construction, the right section of the hollow finger is circular, the said first heat conducting component has a semi-cylindrical section where the diameter is almost equal to the diameter of the inner surface of the hollow finger, and the second heat conducting component has a semi-cylindrical section where the diameter is smaller than the diameter of the inner surface of the hollow finger.

BRIEF DESCRIPTION OF DRAWINGS

The present invention will be better understood in reference to the description of the various embodiments and to the annexed drawings, given as unrestricted examples, in which.

MODE(S) FOR CARRYING OUT THE INVENTION

Figure 1:
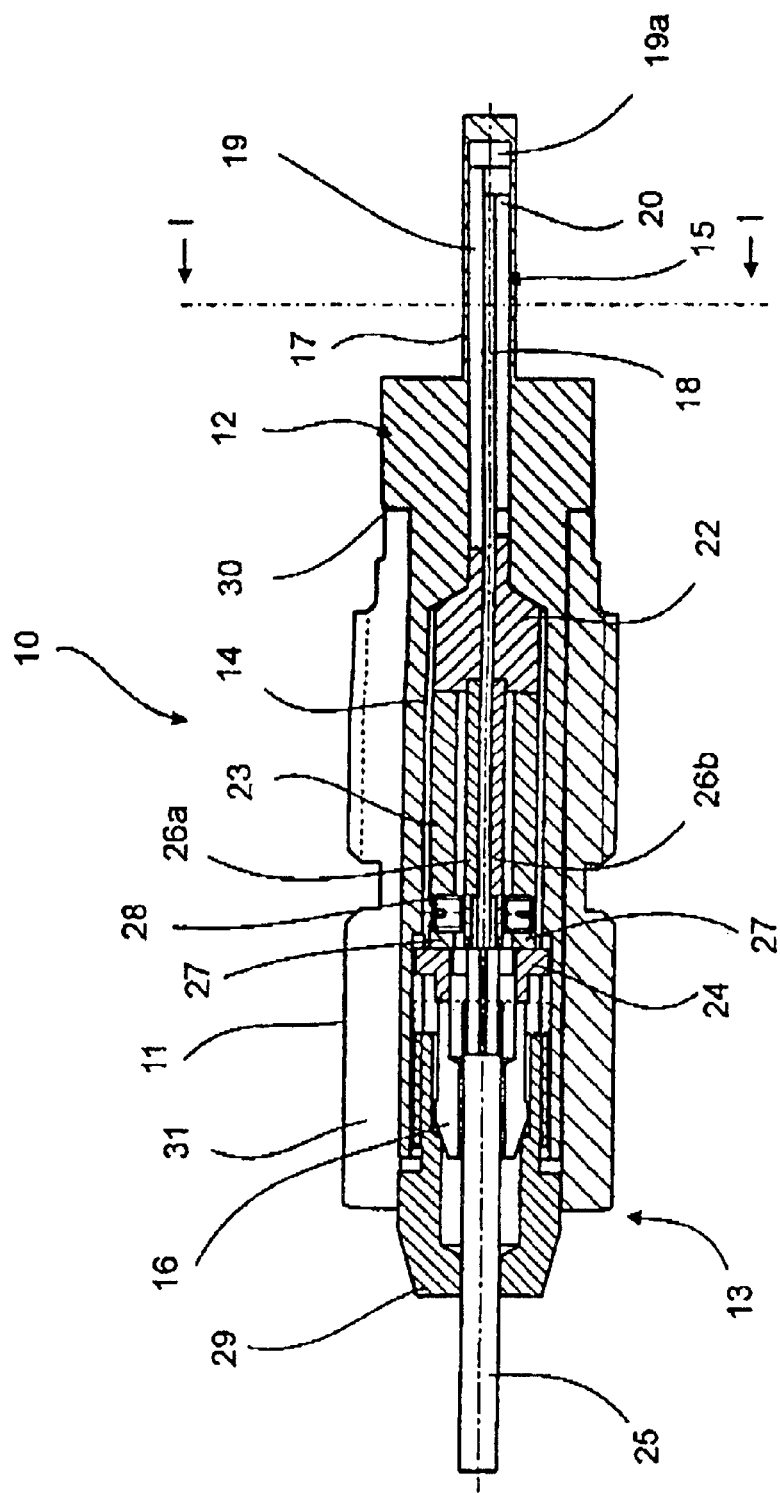
FIG. 1 represents a partial longitudinal section view of a first form of realization of the device according to the invention.
Figure 2B:
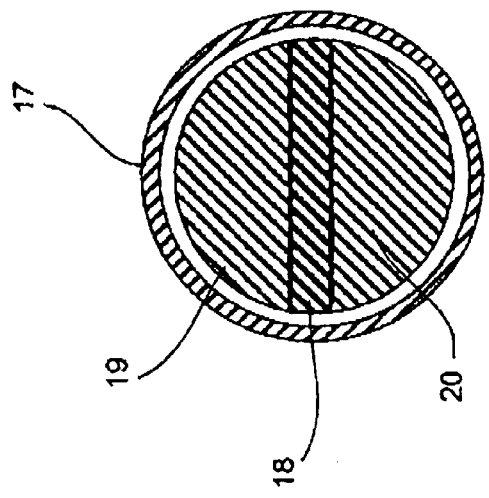
FIG. 2B represents an enlarged partial transversal cross section view along the line I—I of the measuring end of the device represented by FIG. 1.
Figure 2A:
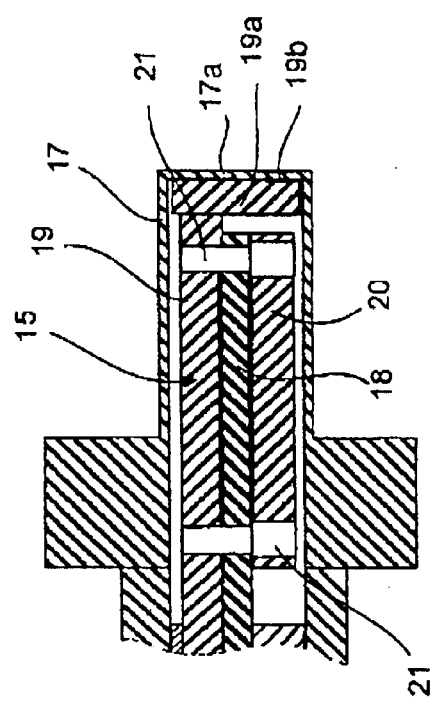
FIG. 2A represents an enlarged partial cross section view of the measuring end of the device in FIG. 1.

With reference to FIGS. 1, 2A and 2B, the device 10 according to the invention comprises a housing 11 of extended shape which comprises a closed measuring end 12, a connection end 13 as well as a central cavity 14. This central cavity 14 contains, on the one hand a measuring cell 15 and on the other hand electrical connection members 16. The housing 11 is extended, on the side of the measuring end 12, by a hollow finger 17, of conveniently circular cross-section, which contains at least partly the said measuring cell 15.

This measuring cell 15 is composed of a thermal flux sensitive element 18 which is sandwiched between a first heat conducting component 19, which constitutes a kind of heat electrode, and a second heat conducting component 20, which constitutes a constant heat capacity referred to as reference heat capacity. The surfaces of contact of the first heat conducting component 19 and the second heat-conducting component 20 are each covered with a layer of gold, in order to make a close thermal link with the thermal flux sensitive element 18. The two heat conducting components 19 and 20 are linked between each other by screws 21 made in a material, which is not very heat conductive.

In the example of realization described and represented by the figures, the said first heat conducting component 19 has a slightly circular cross-section and is provided with a heel 19a at its free end of slightly circular cross-section which comprises a flat surface 19b of circular shape being supported by the inner surface 17a of the hollow finger 17. The diameter of this heel is smaller or equal to the inner diameter of the said hollow finger 17. In a similar manner, the diameter of the said first heat-conducting component 19 is smaller than the inner diameter of the said hollow finger 17 so that this part has no direct contact with the body of the finger. The only contact between the said first heat conducting component 19 and the hollow finger 17 is indirect and is made through the surface 19b of the heel 19a.

A heat insulator 22 mechanically fits onto the first heat-conducting component 19 in this way ensuring the mechanical link between the measuring cell 15 and the connection attachments 16 of the device as well as a good heat insulation of the said measuring cell.

A hollow sheath 23 of cylindrical shape, made in an electrically insulating material, is used as intermediate element located between the heat insulator 22 and a braiding clamp 24 of a bifilar cable 25. Two electrically insulated clamp type terminals 26a and 26b are respectively arranged either side of the thermal flux sensitive element 18 and each comprise a recess 27, in which is engaged an end of each electrically conducting wire or bifilar cable braid 25, applied against one face of the thermal flux sensitive element 18 which comprises on each of its faces an appropriate electrically conducting track. The thermal flux sensitive element 18 is sandwiched between the two electrically insulated clamp type terminals 26a and 26b and held by means of two clamping screws 28 which ensure the clamping of the said terminals by gripping the two electric wires of the bifilar cable 25 together on the electric tracks of the thermal flux sensitive element 18.

The braiding clamp 24 rests, through its end, on the hollow sheath 23 and comprises a cylindrical central boring allowing the passage of conductor wires or the braid of the cable 25. The other end is fitted to operate a coaxial clamping of the braid with the insulation of the cable 25 when an adapter sleeve 29 is screwed on the end of the connection members 13 of the housing 11 and when this adapter sleeve compresses the clamp 24.

The housing 11 is provided with a shoulder 30, which serves as support for a clamping, nut 31 split lengthwise and which extends approximately over the whole length of the said housing 11. This nut is designed to ensure a mechanical link with a support (not shown), which is linked to the environment of the material to be controlled, for example to the sheath of an extrusion press. The clamping nut 31 is provided outside with a thread, which works with the thread of the said support linked to the environment of the material to be controlled.

Figure 3:
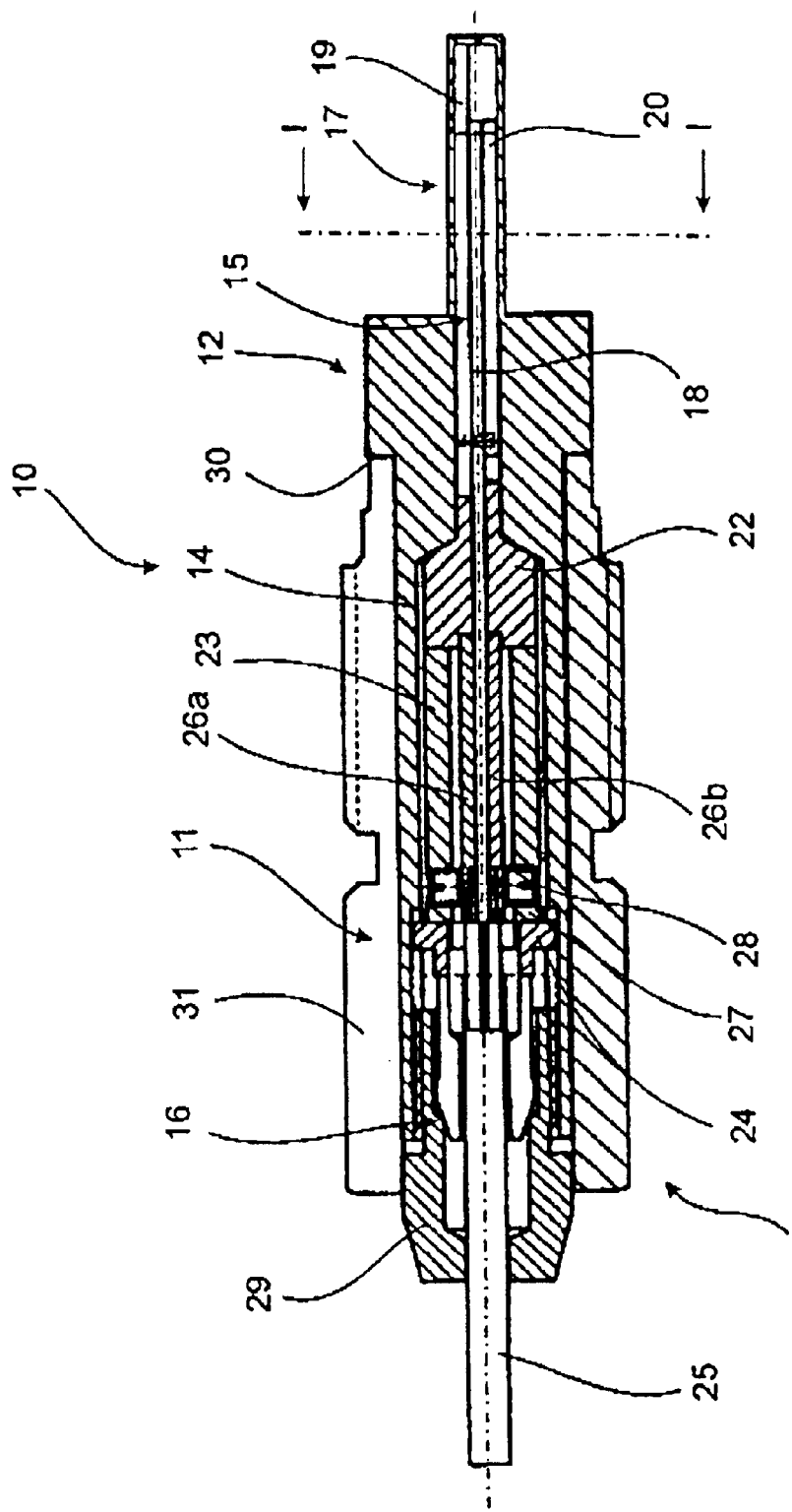
FIG. 3 represents a longitudinal section view of a second form of realization of the device according to the invention.
Figure 4B:
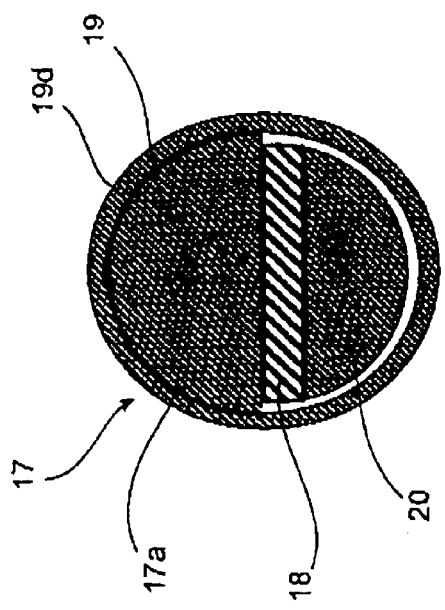
FIG. 4B represents an enlarged partial transversal cross section view, along line II—II, of the measuring end of the device in FIG. 3.
Figure 4A:
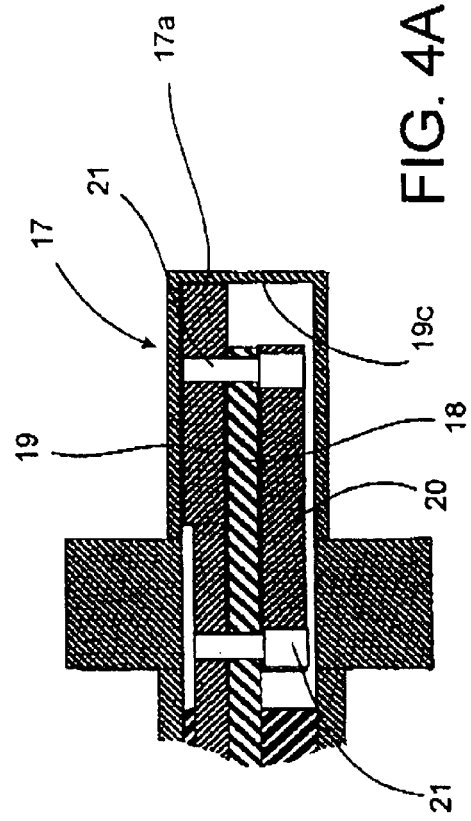
FIG. 4A represents an enlarged partial cross-section view of the measuring end of the device of FIG. 3.

FIGS. 3, 4A and 4B represent views similar to those in FIGS. 1, 2A and 2B corresponding to a second embodiment of the device according to the invention. The similar components will bear the same reference numbers and will not be described in detail. Only components, which differ from those of the previous figures, will be detailed.

In this realization, the said first heat conducting component 19 is not extended by a heel which ensures the contact with the end of the hollow finger 17, but this component itself is extended up to the end of this hollow finger and comprises, at its end, a flat surface 19c, in half-disk shape, which is up against the inner surface 17a of the hollow finger 17. Moreover, the diameter of the said first heat conducting component 19 is equal to the inner diameter of the hollow finger 17, in such a way that the contact between this component and the body of the hollow finger is made directly with the free end of the component and with its lateral surface 19d.

Figure 5:
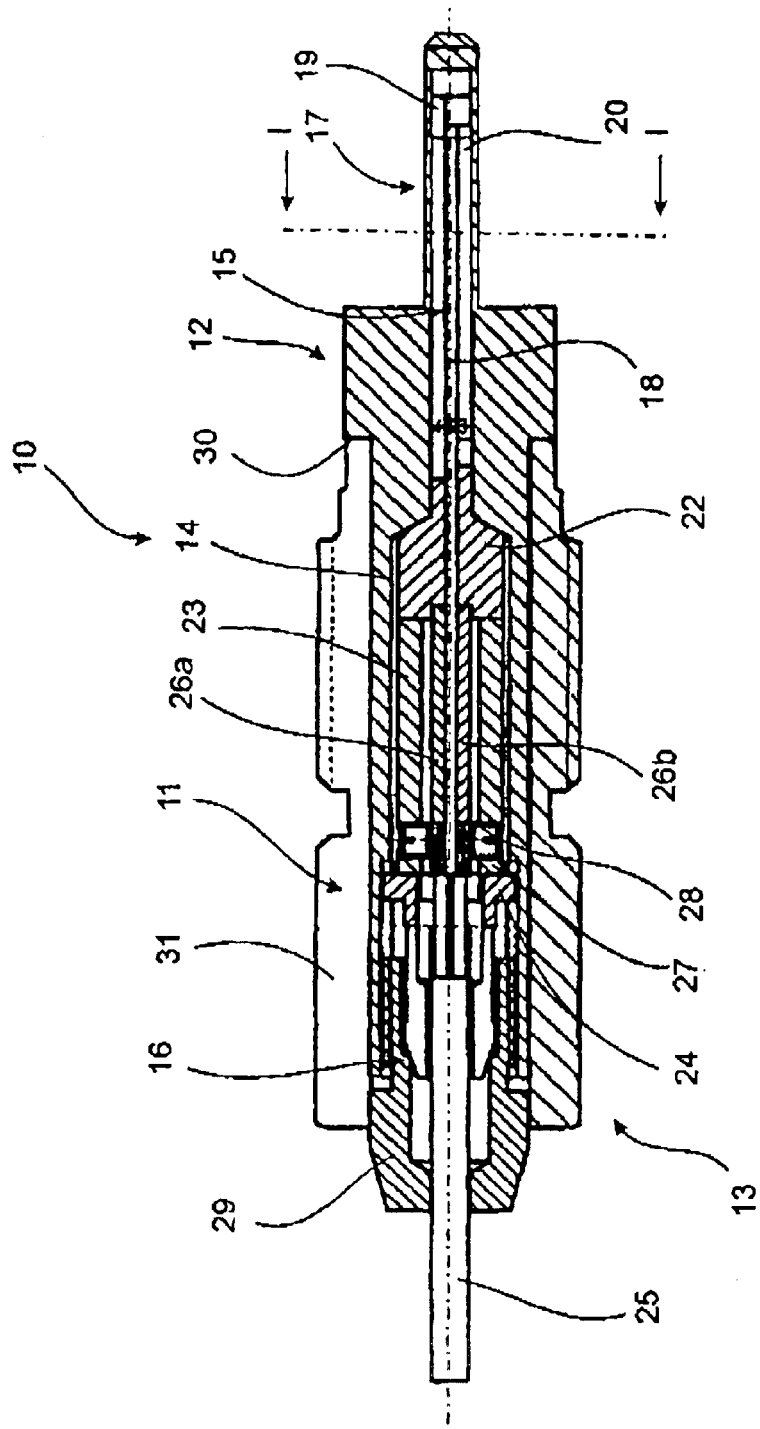
FIG. 5 represents a longitudinal section view of a third form of realization of the device according to the invention.
Figure 6:
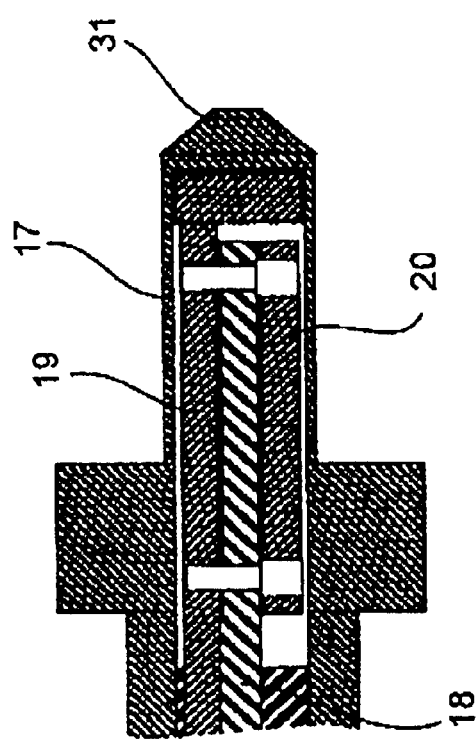
FIG. 6 is an enlarged partial view of the measuring end of the device of FIG. 5, and FIGS. 7A and 7B represent views respectively from above and in longitudinal section of the thermal flux sensitive element of the measuring cell housed in the measuring end of the device of the invention.

FIGS. 5 and 6 illustrate a third form of realization of the device according to the invention. The components similar to those of the previous figures and notably FIGS. 1, 2A and 2B will bear the same reference numbers and will not be described in detail. Only the components, which differ from those in the previous figures, will be detailed.

In this realization, only the end of the hollow finger 17 differs from the finger illustrated in FIG. 1. The hollow finger is extended by a tapered end part 31, which is designed to be engaged in an appropriate boring of an element in contact with the material to be controlled. The tapered form of the end facilitates increasing the surface of contact between the hollow finger 17 and the end part in contact with the material to be controlled obtaining in this way a greater sensitivity and a greater reliability of measurements.

The heel 19a can be replaced by an extension of the said first heat conducting component 19, as is the housing in the realization illustrated in FIG. 3. Moreover, this heel can have a diameter equal to the inner diameter of the hollow finger 17, so as to increase the contact surface of the said first heat-conducting component 19 with the body of the hollow finger.

Figure 7B:
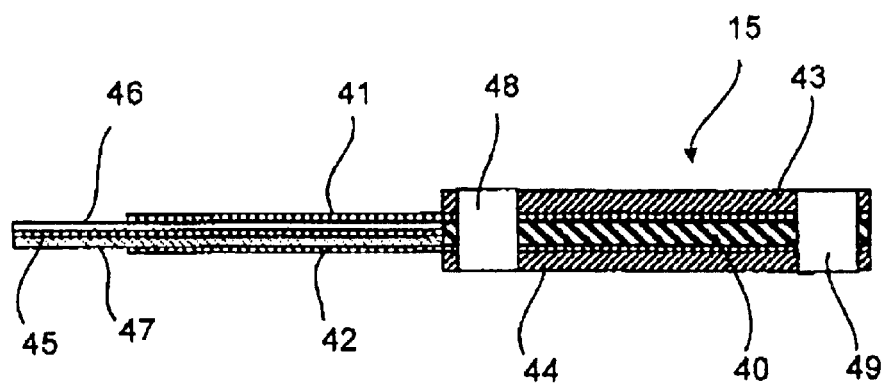
Figure 7A:
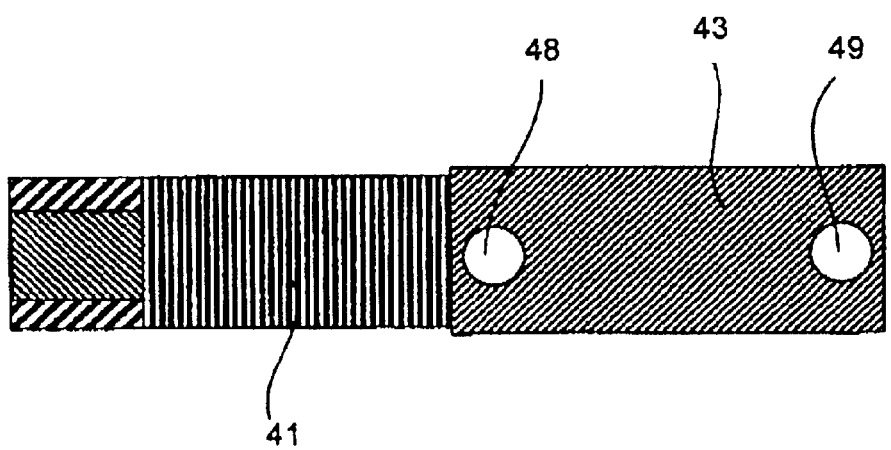

FIGS. 7A and 7B represent the thermal flux sensitive element of the measuring cell 15, respectively seen from below and represented by a longitudinal section. This element comprises a thermal flux detector 40, arranged between a first insulating layer 41 and a second insulating layer 42 which extend beyond the detector towards the connection end. From the side of the measuring end, the two insulating layers 41 and 42 defined above are respectively surmounted by a first copper mass 43, referred to as absorption electrode, and a second copper mass 44, referred to as dissipation electrode. From the side of the connection end the two insulating layers 41 and 42 are separated from a third central insulating layer 45 by two conductor tracks, respectively 46 and 47. Two through holes 48 and 49 are designed on the side of the measuring end to facilitate ensuring the link by screws of the thermal flux sensitive element 18, of the said first heat conducting component 19 and of the said second heat conducting component 20.

The device according to the invention is applicable to the measuring of exchanges of amounts of heat in totally non-stationary operational conditions comprising a low level dynamic buried in a environment highly disturbed by considerable thermal fields.

In practice, the measuring end where the base is flat, as shown by FIG. 2A is usually engaged in a transversal boring in order that this base is in contact with the material to be controlled. The measuring end whose base is tapered, as shown by FIG. 6, is preferably engaged in a blind boring, where the end has the shape of a cone whose summit is arranged at short distance from the passage of the material to be controlled.

In the first case, the body of the sensor, and more especially the side of this body located at the base of the measuring end, must resist considerable pressures, which can reach 2,500 bars. Moreover, the space between the body of the sensor and the side of the boring through-hole is invaded by the material, in particular by plastic material which, on hardening, blocks the sensor in the boring and prevent its dismantling when cold.

In the second case, the body of the sensor is no longer in contact with the material, and is no longer subjected to the considerable pressure of the latter. It can be dismantled at any time in the course of the operation of an extrusion press for example. As the distance between the measuring end and the material to be controlled is short, the heat information is easily transmitted, all the more so as the tapered shape facilitates increasing by a factor of up to four the surface which picks up the variations of heat flux. The contact between the tapered base surface of the measuring end and the conical surface of the tip of the boring is easy to make, which means in the second case one obtains an identical result, even better than the result obtained in the first case, in spite of an increased thermal resistance.

Industrial Applicability

As examples, this device can be conveniently used for:
  the checking on-line of extrusion heads of the "cross head" type so as to better optimize the production by a control based on the rheological parameters of the conditions of the material, notably during complicated extrusions, for example, of cables,
  the checking of moulds used in a drawing blow moulding process, so as to better optimize the production by monitoring based on the control of the crystallization of the material, notably during production of synthetic bottles,
  the checking of the different phases of injection of thermoplastics in a mould, so as to improve the quality, reduce the cycle time and better control the injection process through a better knowledge of different parameters such as the dynamic of pressure, arrival of the material, detection of incomplete items, and the reactions of crystallization, the checking of injection phases of thermosetting material in compression moulds of the SMC type (Sheet Mould Compound) and BMC (Bulk Moulding Compound) so as to better optimize production by a better, the monitoring of rheological parameters, notably during the phase of cross-linking, the checking on the degradation of the grease used notably in the ball bearings subject to high stresses, under heavy load and at very high speed with the aim of optimizing the predictive maintenance.

Tests have demonstrated the reliability and reproducibility of signals delivered and notably a remarkable dependency of the dynamic profile of heat flux with those of the pressure. A series of these devices installed on a screw/sheath system of injection press shows that such a thermomechanical signature has never been obtained up to this day, notably in molten zone, which leads one to hope for significant progress in the knowledge and on-line monitoring and in real-time of injection processes.

What is claimed is:

1. Device for the measuring of exchanges of amounts of heat in non-stationary operational conditions, these conditions being a low level dynamic buried in an environment highly disturbed by considerable thermal fields, the said device comprising an extended housing (11) provided with a central cavity (14), a measuring end (12) and a connection end (13), the measuring end (12) being closed and the central cavity (14) containing, on the one hand, a measuring cell (15) and, on the other hand, electrical connection members (16), the said measuring cell comprising at least one thermal flux sensitive element (18) sandwiched between a first heat conducting component (19) and a second heat conducting component (20), characterized in that the said first heat conducting component (19) is in contact with at the least one surface of the said housing (11), and in that the said second heat conducting component (20) is insulated from the said housing and constitutes a constant heat capacity.

2. Device according to claim 1, characterized in that the measuring end (12) of the housing is slightly flat, and in that one of the ends of the said first heat conducting component (19) is at least partially in contact with an inner surface (17a) of the said measuring end.

3. Device according to claim 2, characterized in that the said first heat conducting component (19) comprises a heel (19a) provided with a contact surface the shape of which corresponding to that of the inner surface (17a) of the said measuring end.

4. Device according to claim 3, characterized in that the said contact surface of the said heel (19a) of the said first heat conducting component (19) is circular.

5. Device according to claim 1, characterized in that the measuring end of the housing (12) is slightly tapered, and in that one of the ends of the said first heat conducting component (19) is at least partially in contact with an inner surface of the said measuring end.

6. Device according to claim 5, characterized in that the said first heat conducting component (19) comprises a heel provided with a contact surface, this contact surface being up against an inner surface having the same shape and dimensions as the said tapered measuring end.

7. Device according to claim 1, characterized in that the thermal flux sensitive element (18) as well as the said first heat conducting component (19) and the said second heat conducting component (20) are coated with a layer of gold, at least on their mutual surfaces.

8. Device according to claim 1, characterized in that the housing (11) comprises, on the side of its measuring end (12), a hollow finger (17) the thickness of which is reduced as compared with the rest of the body of the said housing, the measuring cell (15) being at least partially housed in this finger.

9. Device according to claim 8, characterized in that the measuring cell (15) is maintained at the bottom of the hollow finger (17) through means of compression fashioned to ensure a flattening of the said first heat conducting component (19) against the inner surface of the measuring end (12).

10. Device according to claim 8, characterized in that the cross section of the hollow finger (17) is circular, in that the said first heat conducting component (19) has a semi-cylindrical section the diameter of which is almost equal to the diameter of the inner surface of the hollow finger, and in that the second heat conducting component (20) has a semi-cylindrical section, the diameter of which is smaller than the diameter of the inner surface of the hollow finger.

11. Device according to claim 8, characterized in that the thermal flux sensitive element (18) comprises a thermal flux detector (40) sandwiched between a first insulating layer (41), associated with an absorption electrode (43), and a second insulating layer (42) associated with a dissipation electrode (44).

* * * * *